United States Patent [19]

Klebl et al.

[11] 4,331,281
[45] May 25, 1982

[54] PROCESS AND APPARATUS FOR PRODUCTION OF WELDED TUBES

[75] Inventors: Wolfram Klebl, Isernhagen; Friedrich Schatz; Gerhard Ziemek, both of Langenhagen, all of Fed. Rep. of Germany

[73] Assignee: Kabel-und Metallwerke Gutehoffnungshuette AG, Hanover, Fed. Rep. of Germany

[21] Appl. No.: 107,039

[22] Filed: Dec. 26, 1979

[30] Foreign Application Priority Data

Mar. 23, 1979 [DE] Fed. Rep. of Germany ....... 2911403

[51] Int. Cl.³ .............................................. B02C 31/00
[52] U.S. Cl. ..................................... 228/125; 72/193; 72/370; 228/19
[58] Field of Search ....................... 72/209, 193, 370; 228/19, 125, 147, 199, 200

[56] References Cited

U.S. PATENT DOCUMENTS

| | | | |
|---|---|---|---|
| 3,513,682 | 5/1970 | Rowell | 228/125 X |
| 3,650,456 | 3/1972 | Rowell | 228/19 |
| 3,716,908 | 2/1973 | Rowell | 73/88 X |
| 3,795,358 | 3/1974 | Sarnacki et al. | 228/19 |

*Primary Examiner*—Mark Rosenbaum
*Attorney, Agent, or Firm*—Martin A. Farber

[57] ABSTRACT

An improved process and apparatus for continuous production of welded tubes is disclosed wherein a metal strip material is formed into a tubular form, the longitudinal edges thereof welded, and the welded seam cold worked by the application of a high frequency pulsating force to each area of the seam, while it is supported and widened from within.

4 Claims, 1 Drawing Figure

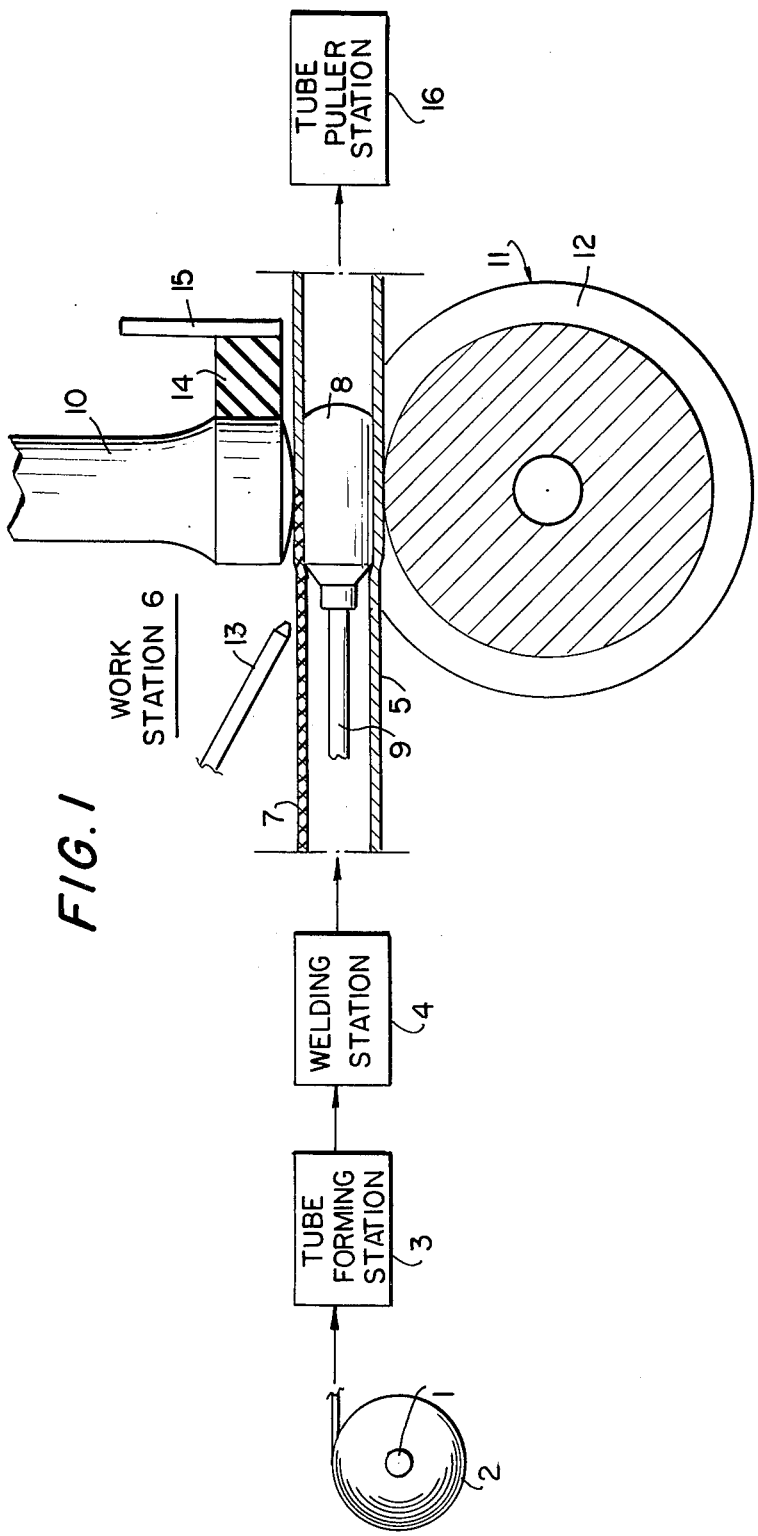

PROCESS AND APPARATUS FOR PRODUCTION OF WELDED TUBES

BACKGROUND OF THE INVENTION

Many techniques have been devised for producing longitudinally welded tubes. However, problems have arisen in these past efforts which preclude the production of tubing having a strong and smooth welded seam.

In longitudinally welded tubes of the prior art, in particular those comprised of nonferrous metals, the welded seams evidence deficient grain structures as compared to the unwelded portions of such tubes. U.S. Pat. No. 3,650,456, discloses an apparatus for the continuous production of welded tubes from a continuous length of metal strip, whereby the strip is shaped into a tubular form so that the longitudinal edges of the strip are brought into abutting engagement, welded and then cold worked by the combination of a support mandrel positioned within the formed tube, an upper roller that engages an area of the outside surface of the welded seam for urging the seam toward the internal mandrel, and a lower support roller acting against the outside surface of the tube. The upper roller that engages the seam has a concave working surface that approximates that of the tube surface, and provides a high pressure condition in the area of contact with the seam to make the seam yield and assume a curvature approximating that of the remaining circumference of the tube.

THE PRESENT INVENTION

It is an object of the present invention to provide an improved method and apparatus for producing welded tubing having a smooth inner and outer tubular surface and a welded seam having a grain structure and associated strength which is comparable to the parent material of the tubing. The object of the invention is obtained by applying a high frequency pulsating shaping force to an area of the outside surface of the seam for urging the welded seam toward an interior support mandrel, such mandrel being of a design to slightly widen the welded seam immediately prior to the application of the pulsating force. The frequency of the pulsating force and the longitudinal speed of the welded tube are selected for assuring that each point of the welded seam is repeatedly subjected to such pulsating force. Preferably, the pulsating force should have a frequency of 20 to 40 KHz for a tube whose longitudinal speed is of 25 to 30 meters per minute. This results in cold shaping or forging of 40 to 80 pulses per mm length. Further, since the pulsating force is applied, for example, by means of a sonotrode whose work surface has a length of 5 mm, the repetitive application of the pulsating force to each point of the welded seam is significantly increased.

BRIEF DESCRIPTION OF THE DRAWING

The invention will be clearly understood by reference to the following detailed description of an exemplary embodiment thereof, in conjunction with the accompanying drawing in which FIG. 1 is a schematic overall view of the continuous tube forming apparatus. Included in such FIG. is a simplified sectional view of a work station 6 for cold working the welded seam in accordance with the principles of the instant invention.

DESCRIPTION OF THE PREFERRED EMBODIMENT

FIG. 1 illustrates a continuous tube forming apparatus embodying the principles of the instant invention. A reel 1 is provided about which metal strip of nonferrous material 2 is wound. The strip is continuously fed to a tube forming station 3 of conventional construction where the strip material 2 is shaped into a tubular form. During the tube forming operation, the edges of the strip material are positioned adjacent to each other for welding. Following the tube forming station 3, the strip material 2 is subjected to the continuous welding operation of a conventional welding station 4 whereby the edges of the tubular formed strip material 2 are united. Subsequent to the welding operation, the welded tube 5 is forwarded to a work station 6 comprising a mandrel 8, which is fixedly positioned in axial alignment with the longitudinally moving welded tube 5 by means of a mandrel rod 9. The outer diameter of the mandrel 8 is slightly larger than the inner diameter of the welded tube 5 for widening the welded tube 5, and consequently widening the welded seam 7, and maintaining a tight engagement between the inner wall of the welded tube 5 and the outer surface of the mandrel 8. The fixed mandrel 8 is positioned between a sonotrode 10 and a lower roller 11, with the welded tube 5 being passed therebetween so that the widened welded seam 7 is engaged by the work surface of the sonotrode 10, while the lower roller 11 has a circumferential groove 12 which corresponds to the widened welded tube 5 so that it supports substantially the entire under surface of the tube 5.

A lubricating device 13 is spacially positioned adjacent to the outer surface of the welded seam 7 immediately prior to the sonotrode 10, for applying a lubricating agent onto the welded seam 7, such agent acting simultaneously as a cooling agent for the welded seam 7. A further lubricating device (not shown) may be positioned within the welded tube 5 and prior to the mandrel 8 for lubricating the inner surface areas of the welded tube 5 immediately prior to its engagement with the fixed mandrel 8. The work surface of the sonotrode 10 that engages the welded seam 7 is comprised of a low friction material such as, for example, a sintered mixture of iron and titanium, which is of minimal weight and highly resistant to wear. To avoid significant longitudinal movement of the sonotrode 10 as a result of frictional forces between the work surface of the sonotrode 10 and the welded seam 7 of the welded tube 5, the sonotrode 10 is affixed to a slightly flexible bearing 14 of, for example, hard rubber, which in turn is fixedly attached to a support member 15. Positioned immediately subsequent to the work station 6 is a conventional tube puller station 16 for moving the welded tube 5 in a longitudinal path.

The operation of the continuous tube forming apparatus illustrated by FIG. 1 may be described as follows:

The strip material 2 is continuously fed through (1) the tube forming station 3 wherein it is formed into a tube with its longitudinal edges opposite to each other, (2) the welding station 4 wherein such opposite longitudinal edges are welded to each other and (3) the work station 6 wherein the welded tube 5 is continuously passed between the sonotrode 10 and the lower roller 11, and axially about the fixed mandrel 8. The aforesaid passage through the work station 6, causes the welded seam to be widened and then immediately cold worked by the ultrasonically operated sonotrode 10, the lower roller 11 acting as a counter bearing for the force pulses applied by the sonotrode 10.

It has been found that welded seams processed in accordance with the instant invention have displayed structural transformations that resulted in there being insignificant differences between the welded and unwelded portions of the manufactured tubes. For accelerating such transformation, the welded tube may be heated to its recrystallization temperature between the welding station 4 and the work station 6.

Having best described the invention with particular reference to the preferred forms thereof, it will be obvious to those skilled in the art to which this invention pertains, that various changes and modifications may be made therein without departing from the spirit and scope of the invention, as defined in the claims appended hereto.

We claim:

1. An improved process for the continuous production of welded tubing from a continuous length of metal strip material comprising:

continuously feeding the strip material in a longitudinal path;

forming the strip material into a tubular form so that the longitudinal edges of the strip are positioned opposite to each other;

welding the edges of the strip to form a continuous length of the tubing having a welded seam; and cold working the welded seam by:
(i) supporting an area of the seam from within the formed tube by means of a mandrel positioned in sliding engagement with the inside surface of said tube;
(ii) applying a force to an area of the outside surface of the seam for urging the cold seam toward said supported area of the seam; and
(iii) supporting the formed tube by
a lower roller acting against the outside surface of said tubing; the improvement comprising:

said step of applying a force providing a high frequency pulsating force to each area of the seam; and said step of supporting an area of the seam including a widening of the seam immediately prior to the application of said pulsating force.

2. The process of claim 1 wherein the frequency of said pulsating force is in the range of 20 to 40 KHz, and said strip is moved in the longitudinal path at a speed of 25 to 30 meters per minute.

3. An improved apparatus for the continuous production of welded tubing from a continuous length of metal strip material comprising:

means for continuously feeding the strip material in a longitudinal path;

forming means for shaping the strip material into a tubular form so that the longitudinal edges of the strip are positioned opposite to each other;

a welder for uniting the edges of the strip to form a continuous length of tubing having a welded seam; and means positioned subsequent to the welder for cold working the welded seam, including:
(i) mandrel support means positioned within the formed tube for supporting the tube;
(ii) force means for urging the cold seam toward the support means to cold work the seam; and
(iii) a lower roller acting against the outside surface of said tubing;

the improvement comprising:

said force means including a sonotrode for applying a high frequency pulsating force into each area of the seam it engages; and said mandrel support means including a mandrel positioned in sliding engagement with the inside surface of said tubing and having a diameter slightly larger than the inner diameter of said tubing for widening the seam immediately prior to the application of said pulsating force.

4. The apparatus of claim 3, wherein said sonotrode has a work surface of low friction material which engages and shapes the outside surface of the widened welded seam, and is positioned within a resilient bearing for restricting its longitudinal movement.

* * * * *